July 14, 1959   G. S. HISCOCK   2,894,668
METHOD OF MAKING INDIVIDUALIZED DRESS FORMS
AND DRESS FORM CONSTRUCTION
Filed May 2, 1956   5 Sheets-Sheet 1

FIG. 1

Measurement Sheet

1. Shoulder _________ ½ ____
2. Underarm _________ ½ ____
3. Bust _________ ½ ____
4. Underbust _________ ½ ____
5. Waist _________ ½ ____
6. Upper Hip _____ ½ ____ Down ⎫
7. Lower Hip _____ ½ ____ From ⎬ ____
                          Waist ⎭
                          Line
8. Back Length _________ ⎫ From Neck To
9. Front Length _________ ⎬ Waist Line
10. Thickness Of Body
    a. Between Bust _______
    b. Waist _______
    c. Lower Hip _______
11. Arm Thickness _____ Width _____
12. Waist _______ Front _____ ½ _____
                Back _____ ½ _____
13. Lower Hip _____ Front _____ Back _____

Name _______________________

Address _____________________

____________________________

Customer's
   NO. _______________

FIG. 2

INVENTOR
Grace S. Hiscock
BY
ATTORNEYS

July 14, 1959 G. S. HISCOCK 2,894,668
METHOD OF MAKING INDIVIDUALIZED DRESS FORMS
AND DRESS FORM CONSTRUCTION
Filed May 2, 1956 5 Sheets-Sheet 3

INVENTOR
Grace S. Hiscock
BY
ATTORNEYS

July 14, 1959 G. S. HISCOCK 2,894,668
METHOD OF MAKING INDIVIDUALIZED DRESS FORMS
AND DRESS FORM CONSTRUCTION
Filed May 2, 1956 5 Sheets-Sheet 4

INVENTOR
Grace S. Hiscock
BY
ATTORNEYS

July 14, 1959  G. S. HISCOCK  2,894,668
METHOD OF MAKING INDIVIDUALIZED DRESS FORMS
AND DRESS FORM CONSTRUCTION
Filed May 2, 1956  5 Sheets-Sheet 5

INVENTOR
Grace S. Hiscock
BY
ATTORNEYS

… … …

2,894,668

METHOD OF MAKING INDIVIDUALIZED DRESS FORMS AND DRESS FORM CONSTRUCTION

Grace S. Hiscock, New York, N.Y.

Application May 2, 1956, Serial No. 582,216

14 Claims. (Cl. 223—68)

The present invention relates to individualized dress forms, and, more particularly, to an improved method of making such dress forms and to an improved dress form construction.

The purpose of the invention is to provide an individualized dress form, which so closely corresponds to the shape, contour, size, posture, and resiliency of the body or person of the individual for whom it is made that dresses and other garments can be fitted to the dress form, so as to eliminate the necessity for the attendance of the individual for fitting. The methods heretofore employed for making such forms have either required an objectionably long time in making what is called the "impression" of the person so that the advantage of an individualized dress form was largely lost, or have produced dress form constructions that were objectionable for lack of durability, convenience in use, and other reasons.

An important object of the present invention is to provide a dress form construction and a method of making it whereby the amount of time spent in the shop by the client, or person for whom the dress form is to be made, will be reduced to a minimum, the person being required to make only a single visit to the shop.

Another object of the invention is to provide a method by which a dress form can be produced which is of a durable nature, so that it will withstand repeated use and does not have to be handled with care to avoid damage to the contours of its surfaces.

A further object of the invention is to provide a dress form construction, which is convenient to use because of the ease with which fittings of a garment to the form may be made, the form being substantially as resilient and flexible as the human body which it simulates.

A still further object of the invention is to provide a dress form construction, which will facilitate the insertion of the filling material within the interior of the form.

The procedure in accordance with my invention commences with the taking of certain measurements from the person or figure of the individual for whom the individualized dress form is to be made. These measurements are used later on in checking the accuracy of the form.

The first step in making the dress form is to make the impression. For this purpose, the individual, stripped to her foundation garments, is covered from the neck to somewhat below the hips with a layer of thin, very flexible protective material, for example, a fairly thin plastic film. A considerably heavier flexible but inextensible sheet material, such as vinyl plastic, having a coating of pressure-sensitive adhesive on one side, is applied over the protective plastic layer. Such adhesive sticks without being wet, and sticks just enough so that the sheet material can be removed and shifted, if necessary. This material is applied in tape or strip form using at some places a roll one inch in width and at others a two-inch roll.

At some parts of the torso, the tape is carried entirely around the body, overlapping each turn to some extent. At other portions of the body, the material is applied in short strips and the thickness is built up where needed to make the flexible, inextensible material, when removed, retain the form, in which it has been "molded" on the human figure. Also, in certain areas, short strips are applied at different angles to one another, particularly over the rounded portions having the greatest curvature, such as the bust, shoulders, and hips.

The two layers, which have now been applied, first, the plastic film layer and, second, the vinyl layer, and which are adhesively secured together, constitute the impression. The next step is to sever the impression along the vertical center lines, front and rear, and remove these two half portions from the person.

No further attendance on the part of the client is required, and she is now dismissed and need not return for any later appointments, either in connection with the making of the dress form, or in connection with the fitting of any dress or other garment, which she may desire to have made.

The two half portions of the impression are next cut longitudinally into sections, each advantageously being cut into two front and two rear sections. Each of these impression sections is then flattened by slitting and opening angular or wedge-shaped slots at its rounded portions, such as the shoulder-arm area and bust area. The outlines of all of these sections are then traced on a large sheet, or sheets, of adhesive-backed inextensible material, such as Vinylite or paper, and such large sheet, or sheets, are now applied to the fabric facing of a sheet of material, such as that sold under the trade name Braform, or other cellular rubber sheet material about one-fourth of an inch in thickness and having a fabric facing.

Both the vinyl plastic sheet and the cellular rubber material are now cut simultaneously along the traced outlines of the impression sections, the vinyl material is then removed and the angular slots, which have been cut in the cellular rubber material, are closed and their abutting edges are stitched together. In this way, the rounded formations of the original impression sections are reproduced in the cellular rubber material. These sections of the cellular rubber material form a shell structure for the dress form when they have been stitched together along their longitudinal edges.

In addition to the side sections of the dress form, just described, there are two collar sections and two small sections to close the openings underneath the arms. These are made of the fabric-faced cellular rubber material and, when stitched in place, the outer shell of the dress form is complete. In the shell thus constructed are then placed a foam rubber shoulder form and bust forms, and the upper portion is filled with suitable resilient packing material. Finally, the lower part of the shell is reinforced and the whole is mounted upon a supporting standard.

In sewing together the sections of the cellular rubber material, the vertical seams are made to project outwardly from the fabric facing, to be used as guides for the placing of seams and darts in the most advantageous positions when cutting directly on the form, or when adjusting a commercial pattern, and in addition so that, when a garment is draped upon the dress form, a garment of silk or other light fabric, for example, it will not tend to cling to the form and can be easily manipulated during the fitting. During this operation, it is usually necessary to secure the various sections of the garment in place by the use of pins, and the thick cellular rubber shell provides a support for these pins, which is easily penetrated and from which the pins can be readily removed.

Additional features of the method and construction of the improved dress form will be apparent from a consideration of the accompanying drawings and the detailed description following:

Figure 1:
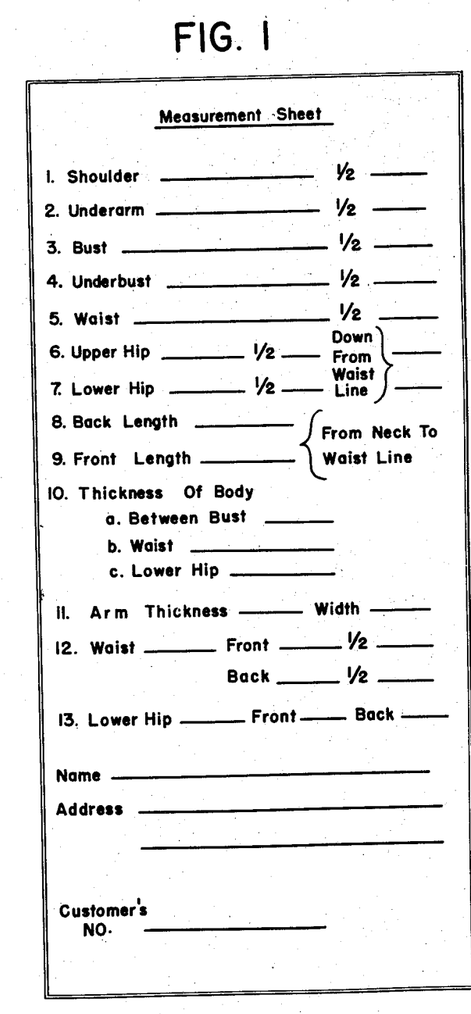
Fig. 1 shows a chart of the measurement sheet.
Figure 2:
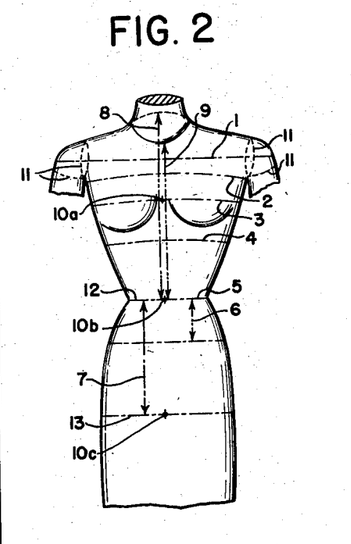
Fig. 2 is a diagrammatic perspective of a portion of a human figure showing the positions of the measurements to be taken and recorded on the measurement sheet.

When an individual visits the shop to have an impression made, the measurements shown in Figs. 1 and 2 are first taken. For these measurements, and also for the making of the impression, the client is clothed only in her foundation garments. The manner of taking the measurements is clear from these figures, or will be so with the following comments.

*Measurements 1 through 7.*—The half measurement is from center front to center back.

*Measurements 6 and 7.*—The "down-from-waistline" measurement indicated at the right is taken from the waistline to the top of the pelvic bone. The similar measurement at the right of measurement 7 is taken to the hip joint, that is, to the widest part of the hip.

*Measurement 12.*—The front of the waistline is always one inch more than the back of the waistline, so that each must be computed separately.

*Measurement 13.*—The front lower hip measurement is the same as that of the back lower hip, and, therefore, this complete measurement, taken from side seam to side seam, is divided in half.

A tape measure may be used for measurements from 1 through 9, whereas calipers should be used for measurements 10a, 10b and 10c, and 11.

The first step in making the impression is to cover the body with a thin plastic film 14 (Fig. 3), using advantageously a roll six inches wide and wrapping it about the client's person from the upper part of the neck downward to the widest part of the hips, or somewhat below, overlapping the successive turns. Care should be taken also to cover the shoulders and to encircle the upper portions of the arms, the purpose of this layer being to protect the client's clothes and skin from contact with the adhesive-backed material, which is to be presently applied.

Over such a thin protective layer, there is applied one or more layers of the adhesive-backed inextensible but flexible sheet material of considerably greater thickness and body than the protective layer. This material can best be applied in tape form. A plastic sheet material, such as Vinylite, with a coating of adhesive on one side, has been found advantageous to use, but other plastic material, such as masking tape, or other sheet material which is sufficiently flexible, yet tough and substantially inextensible and coated on one side with pressure-sensitive adhesive, can also be used.

In applying the vinyl plastic material, or the like, the waist and midriff are first bound with one inch adhesive-backed Vinylite tape at the waist, and two inch Vinylite tape at the midriff. Then, one inch vinylite tape is applied around the body closely beneath the arms to establish the correct position of the lower parts of the arm sections.

Short lengths 15 (Fig. 3) of one inch tape are then applied to build up and cover the busts and, after that, the back, shoulders, and chest are covered with short lengths 16 of two inch Vinylite tape. Then the neck and tops of the arms are wrapped with one inch tape 17. Then the body below the waistline is bound with two inch tape 18 down to somewhat below measurement 7, that is, the widest portion of the hips.

Figure 3:
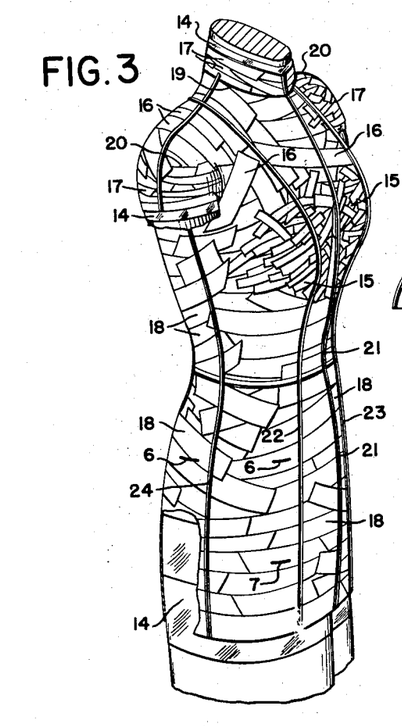
Fig. 3 is a perspective view showing an impression ready to be removed from the person of the client for whom the dress form is to be made.

The next step is to mark the neck line 19 with crayon.

A supply of narrow colored Scotch tape, about one-quarter inch wide, is provided and used for locating the positions where the seams are to be. Thus, the shoulder seams 20 are located by applying strips of this colored tape; also, the center front seam 21, the left side seams 22, right side seams 23, the left side seam 24, and the right seam 25. The center back seam 26 is also located with Scotch tape. The positions for measurements 6 and 7 "down-from-waistline" are marked with crayon, as indicated.

All half measurements 1 through 7 are now checked, and the positions of the side seams at the waist and lower hip are calculated from measurements 11 and 12 and indicated with crayon.

Figure 4:
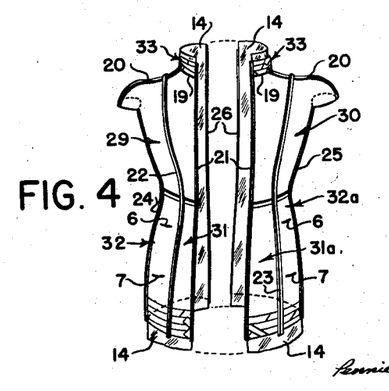
Fig. 4 shows the impression severed into two sections and removed.
Figure 5:
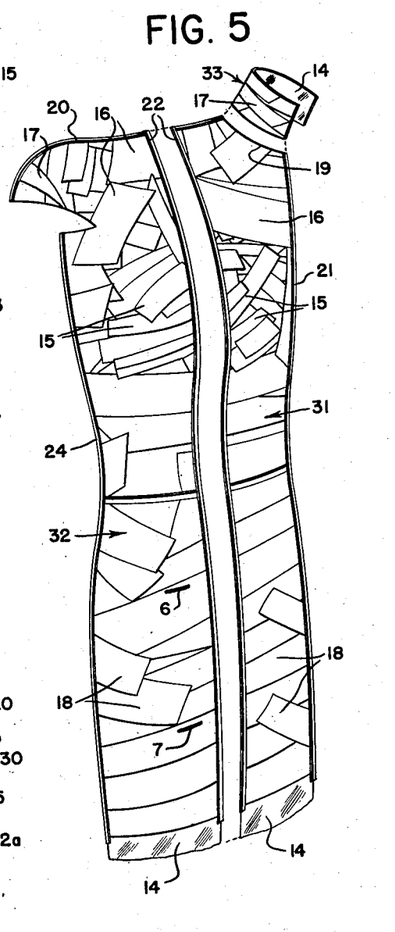
Fig. 5 shows the front of the left-half portion of the impression shown in Fig. 4 cut vertically into two sections.

The next step is to sever the impression along the centers of the front and rear Scotch tapes 21 and 26, but, before doing this, all measurements should be rechecked for accuracy. The impression is now removed from the client's person in the two half portions 29 and 30, as shown in Fig. 4. These operations should require from thirty to forty-five minutes and the client is now dismissed and her presence is not again required.

The two half portions of the impression are now cut into four sections by cutting along the centers of the shoulder tapes 20 and the vertical tapes 22 and 24, it being remembered that the tapes 22 and 24 extend over the shoulders and down the back to the bottom edge. Each half portion of the impression is thereby cut into four sections, namely, a center front section 31, a side front section 32, and corresponding side back and center back sections. In addition to these four principal body sections, the neck section 33 of each half portion is severed along the crayon line 19.

Figures 6, 7, 8:
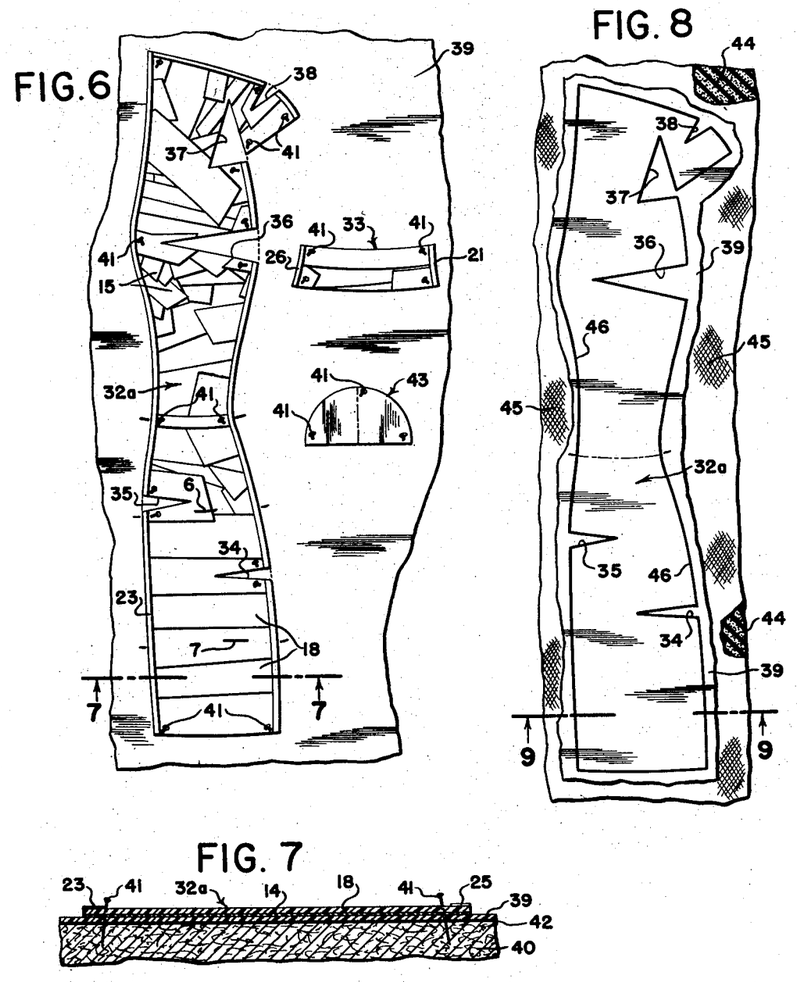
Fig. 6 shows a single impression section flattened by slitting and slotting and laid upon a large sheet of the adhesive-backed sheet material ready for tracing.
Fig. 7 is a vertical section taken on line 7—7 of Fig. 6.
Fig. 8 is a view showing the outline of the impression section shown in Fig. 6 traced upon the sheet of adhesive-backed material, and with this sheet adhesively secured to a large sheet of the fabric-faced thick cellular rubber material.
Figure 9:
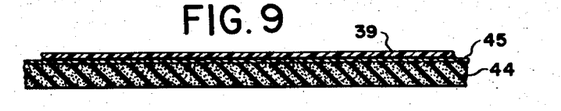
Fig. 9 is a vertical section taken on line 9—9 of Fig. 8.

These eight body sections and two neck sections are now reduced to patterns, that is, flattened by slitting at the principal rounded portions of each section and spreading the material at each side of the respective slits so as to make V-shaped or wedge-shaped slots or notches. Such slots are shown in Fig. 6 where the side front section 32a from the right-half portion 30 is shown laid out flat. Thus, there are two wedge-shaped portions 34 and 35 in the lower part, and wedge-shaped openings 36, 37, and 38 in the upper part in the arm and adjacent shoulder section.

The purpose is to reproduce in thick cellular rubber sheet material the several sections of the impression, so that these sections of the cellular rubber can be sewed together to form the shell of the dress form and correspond accurately to the impression in shape and size. In order that the curved formations of the impression may be accurately reproduced in the cellular rubber material, it is important that the patterns be made with a high degree of accuracy and that the sections of the rubber material be cut accurately to the pattern outlines.

To this end, the cellular sheet material having a fabric facing on one side, such as the material sold under the trade name of Brafoam, is employed and the several pattern sections of the impression are transferred to the dimensionally stable, substantially inextensible sheet material having a coating of pressure-sensitive adhesive on one side, and this material after having the outlines of the several impression sections traced upon it is adhesively applied to the fabric facing of the Brafoam. For this dimensionally stable material, adhesive-backed Vinylite similar to that referred to previously has been found satisfactory.

By merely tracing the pattern outlines on such material and then adhesively applying it to the fabric-faced rubber material, and by cutting both the Vinylite sheet and the rubber material simultaneously along the traced outlines of the patterns, the rubber material is cut accurately to the shape desired, inasmuch as the Vinylite sheet will adhere to the cloth surface of the foam rubber material as it is cut, and without requiring the use of pins or weights to hold it in place.

In tracing the outlines of the various sections of the impression on the adhesive-backed Vinylite, a sheet 39 of this material large enough on which to trace a number of pattern sections is laid upon a cutting board 40 (Fig. 7). Although a sheet large enough to accommodate the tracing of all eight pattern sections may be used, it is convenient to use two sheets and trace half of the pattern sections on each.

Figs. 6 and 7 show a fragment of such a sheet, with the pattern section 32a secured upon it by means of pins, as indicated at 41. In Fig. 7, the reference numeral 42 designates a paper backing sheet to protect the adhesive on the bottom surface of the Vinyl plastic 39. Numeral 14 indicates the layer of thin plastic film, which adheres to the bottom surface of the impression.

In Fig. 6, alongside of pattern section 32a, a part of the neck section 33 is also shown as being secured to the cutting board and the surface of Vinylite sheet 39 by means of pins 41. A semi-circular pattern 43 for a part for closing an arm section is also shown in position ready to be traced.

Referring to Fig. 8, there is shown a fragment of a large sheet of the cellular rubber material, which is laid flat on a suitable supporting surface (not shown) with its fabric facing 45 uppermost, and to this has been secured the large sheet 39 of Vinylite, the backing 42 having been previously removed in order to expose the adhesive. The outline 46 of pattern 32a has been traced upon the surface of sheet 39, and the holding pins and pattern then removed. It will be understood that sheet 44 of the Brafoam material is of sufficient size to receive the entire sheet 39 of the Vinylite plastic containing traced outlines of at least the four sections of the right portion 30 of the impression. A similar large sheet of Brafoam and of the Vinylite plastic 39 will contain the traced outlines of the four sections of the left portion 29 of the impression. Also, each of these sheets will contain a traced outline of half collar portion pattern 33 and of one of the underarm section patterns 43.

The next step is the cutting out of these eight body sections and the two collar portions and underarm sections from the sheet or sheets 44 of the Brafoam rubber material. This is done by hand with shears following the traced outlines, such as outline 46, for each of the sections, and the Vinyl plastic material 39 and the rubber material 44 are cut simultaneously along these outlines. In cutting along the vertical lines, a ⅛" seam allowance is required.

The Vinylite plastic sheet is now removed from each of the cellular rubber sections, and, in order that these sections may be sewed together to make the dress form shell 47 (Fig. 11), each of the wedge-shaped openings 34, 35, 36, 37, and 38 of each of the cellular rubber sections is closed and the abutting edges are stitched together so as to thereby shape or form the several rubber sections, so that they have substantially the same curved surfaces therein as the corresponding sections of the impression.

Figures 10, 11, 12, 13:
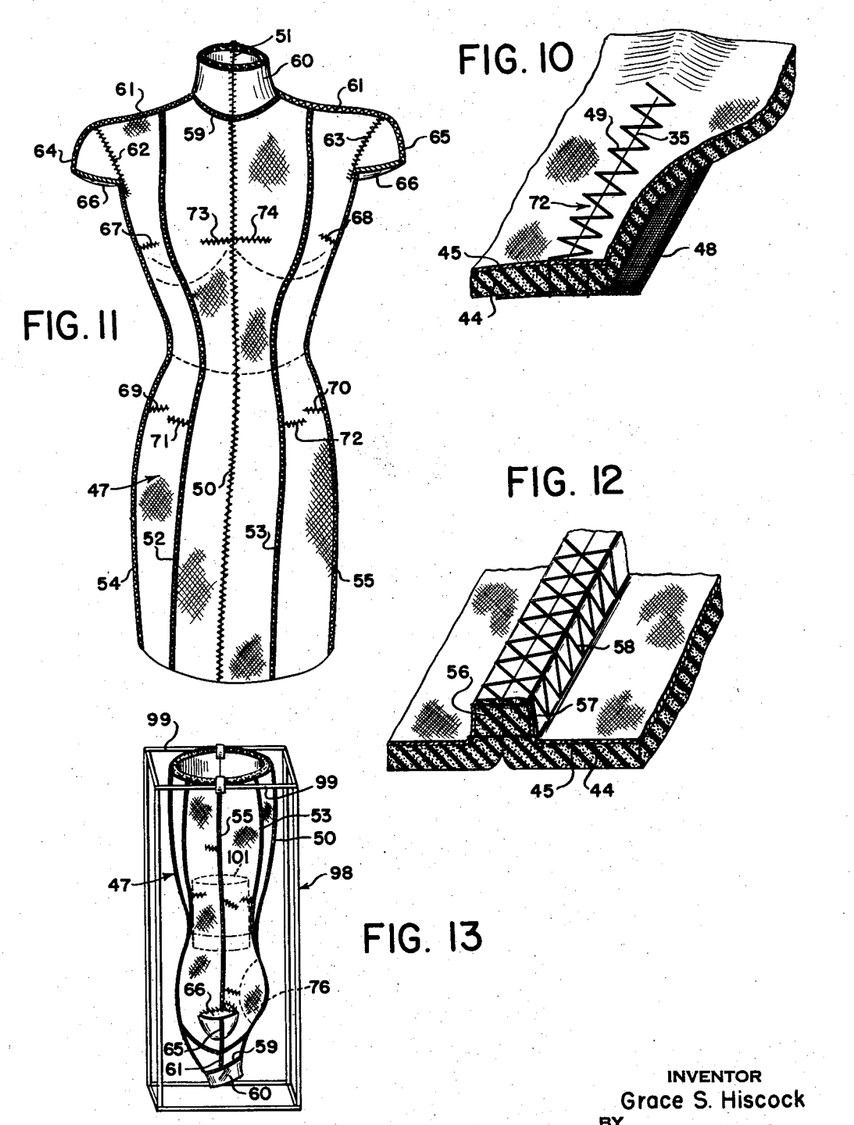
Fig. 10 is an enlarged fragmentary perspective view showing the closing of one of the wedge-shaped openings in one of the formed sections cellular rubber material.
Fig. 11 shows in perspective the completed shell structure of a dress form.
Fig. 12 is a perspective detail showing the manner of stitching to form the ribbed vertical seams.
Fig. 13 is a perspective view of a supporting rack used in filling a part of the shell with resilient packing material.

In Fig. 10, the manner of stitching together the abutting edges of one of the wedge-shaped openings 35 is illustrated. A thin piece of fabric 48, such as buckram or muslin, is placed underneath to reinforce the lower surface of the rubber. A zigzag stitch 49 is used, so that the threads pass vertically through the rubber and fabric at a distance from the abutting edges. During this operation, the rubber material is shaped by hand into the rounded formations of the impression and held in such position while stitching.

With all the shell sections re-formed in this manner to correspond with the respective shapes of the impression sections, these shell sections are now stitched together. In doing this, the waistlines, which have been previously marked on the cellular rubber sections, must be matched exactly, and also the shoulder lines. The center front seam 50 (Fig. 11) and the corresponding center back seam, which is not visible, as well as the center back seam 51 of the neck section, are flat seams with edges of rubber abutted and stitched with a zigzag stitch with the fabric reinforcement underneath, as described.

The remaining seams, such as the side front seams 52 and 53 with their corresponding back seams, which are not visible, and the side seams 54 and 55, are all stitched with the adjacent margins of the cellular rubber turned outwardly in flat contact with one another, as shown at 56 and 57 in Fig. 12. These are then stitched to one another with an overcastig stitch 58, thereby forming a ribbed seam. The seam 59 between the top of the shell and the neck portion 60, as well as the shoulder seam 61, are formed in the same manner.

The stitch lines 62 and 63, which have been previously put in, serve to hold together the previously wedge-shaped openings 37 and 38 in the vicinity of the shoulders and to impart the arm formation to the small upper arm sections 64 and 65 of the shell. The opening beneath each of these arm portions is closed by a small semi-circular cellular rubber section 66, two of which have been cut out from the two semi-circular pattern sections 43. Stitch lines 67 and 68 close the wedge-shaped aperture 36 in the two side front shell sections. Also, stitch lines 69 and 70 indicate the closing of the two wedge-shaped openings 34 in these same sections, and stitch lines 71 and 72 show the closing of wedge-shaped openings 35. It will be understood that the outward curves of the dress form are largely imparted by these stitch lines. Stitch lines 73 and 74 close similar wedge-shaped openings in the two center front sections, and like the stitch lines 67 and 68 aid in producing the outward curvature in the bust region.

Figure 14:
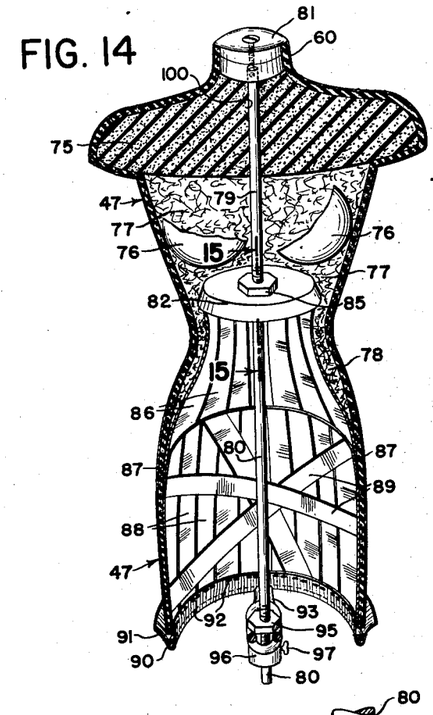
Fig. 14 is a view in vertical central section through a completed dress form.

With the shell structure 47 completed, the final steps in making the dress form are the filling of this structure and mounting it upon a suitable supporting standard. Before reviewing the assembly and detailing these steps, however, the construction of the completed dress form, as shown in Fig. 14, will be described. Within the upper portion of the outer shell 47, there is a shoulder shape or form 75 of molded foam rubber or other suitable cellular material. Cemented to the interior surface of the shell 47 are two foam rubber bust forms 76, and the area behind these forms and below the rubber shapes 75 is filled with resilient packing material 77, such as rubberized hair, moss, foam rubber scrap, or the like. This packing material extends downwardly through the main body of shell 47 around the waist and in the area 78 at the upper part of the hip portion.

The form is supported by means of upper and lower rigid tubes 79 and 80, preferably of metal, the lower tube extending downwardly and being mounted upon any suitable supporting standard. A swivel support is desirable so the form may be turned easily. The length of the upper tube 79 is such as to extend from a point within the neck portion 60 to the region of the waist. At the upper end of tube 79, a wooden plug (not shown) is inserted, and a cap 81 of wood is arranged to close neck portion 60 and is secured to this plug.

Near the lower end of tube 79, there are two plate-like members 82 and 83, shown as being elliptical in shape and having cooperating conical flanges. These plates together form a diaphragm support and, in fact, serve to tie the entire dress form structure to the supporting rod system 79 and 80. The lower plate 83 rests upon a coupling 84, by which the two sections of tubing 79 and 80 are connected together. A nut 85 threaded around the lower end of rod 79 serves to hold the flange portions of the two plates 82 and 83 in clamped position. Between these flange portions and secured by adhesive on both sides are the upper end portions of a series of strips of sheet material, such as, for example, heavy tag paper. This paper is also provided with a pressure-sensitive adhesive on its outside surface. The strips are held by this adhesive to the inner surface of the flange of the outer plate 82 and liquid adhesive is applied to cause the inner surfaces of the strips to be secured to the flange of inner plate 83.

After the packing material at the hip region 78 has been inserted, as will be described later, the lower portions of the strips 86 are secured by means of their exterior adhesive coating to the inner surface of shell 47 at about the level indicated at 87. Then additional vertical strips 88 may be applied overlapping the lower ends of strips 86 and also overlapping one another and extending down to the lower edge of the shell. Additional angular strips 89 may also be added, if desired, for further stiffening.

Figures 17, 18:
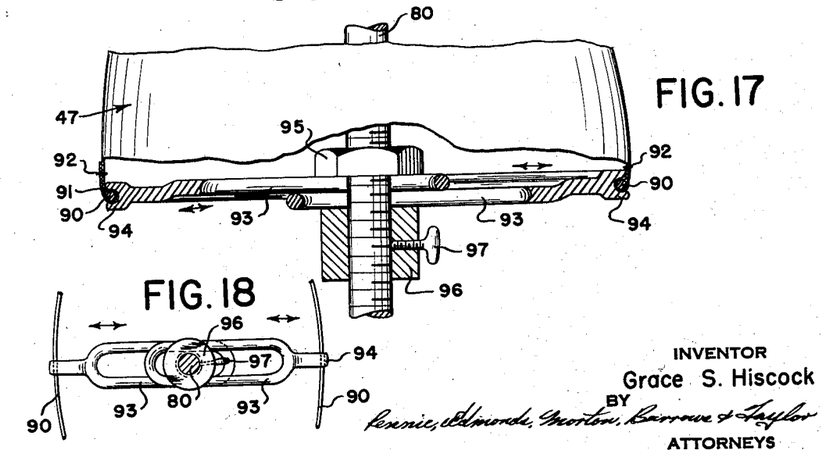
Fig. 17 is a fragmentary view, partly in elevation, and partly in vertical section, showing the construction at the bottom of the dress form.
Fig. 18 is a fragmentary view of the parts shown in Fig. 18 as seen from the bottom, and drawn to a smaller scale.

Upon the lower edge of shell 47, there is mounted a ring of heavy wire 90. This is secured to shell 47 by means of a wide tape 91, the center of which surrounds the wire and the margins of which are held on opposite sides of the margin of shell 47 by means of staples 92. The principal support for the dress form is at the bottom where there are provided two bracket members 93. These members are secured at their respective outer ends to ring 90 as, for example, by providing a fork 94, the sides of which are pressed inwardly, so as to engage the wire.

The inner portions of members 93 are slotted and surround the lower supporting tube 80. They are clamped together on this tube between a nut 95 above and a collar 96 below which has a thumbscrew 97 for purposes of locking and adjustment. By loosening collar 96, the arms 93 can be adjusted radially for the purpose of changing or adjusting the lower part of the dress form to various body widths. Also, such an adjustment may be made for the purpose of holding the forward or back portion of the form at different distances from the supporting tube 80 according to the individual's posture.

With any given size of shell structure 47, the overall size of the dress form may be varied to a limited extent. Thus, for example, a shoulder shape 75 of foam rubber, which is somewhat larger than the shell, may be used and compressed to fit into the shell, so that the shell itself will be stressed to increase its size. If the shoulder shape is too long, a section may be removed from its center, either to make the shoulder shape a better fit within the shell, or to reduce somewhat the amount, by which the shell is stretched. The thickness from front to back and the width across the shoulders of the shoulder shape may be increased, if necessary, by forcing a strip of cellular rubber or packing material into a slash molded in and extending throughout the entire length of the underside thereof.

In assembling the dress form, after the shell has been completed, the bust forms 76 are first placed within the shell and secured in position by rubber adhesive. If the bust form is too large, some of the rubber at the back is removed. If it is too small, one or more slashes which are originally molded in the back may be filled with resilient packing material. When the adhesive has set, the shoulder shape 75 is inserted, checking the dimensions of the outside of the shoulder portion of the form with the dimension sheet and making any necessary corrections as indicated above.

The wire ring 90 is then stapled to the lower edge of the shell as previously described, and the shell 47 is inverted and hung within a rigid rectangular frame 98 as illustrated, for example, in Fig. 13. The wire ring may be secured in any convenient manner to the top parallel cross-bars 99.

The upper tube 79 with nut 85 thereon is then placed in position and held there by frictional contact with the walls of a vertical aperture 100 made in the shoulder shape 75 to receive this rod. Next, the chest section of shell 47 is filled with the packing material 77, which is pressed firmly into place, and the upper plate 82 is placed in position with its center aperture upon the threaded lower end of tube 79, so that the plate rests on nut 85. Coupling 84 is then temporarily screwed in place, so as to firmly clamp plate 82.

A hollow cardboard cylinder 101 (Fig. 13) may now be inserted within the shell 47 to rest upon plate 82, and packing material is inserted on the outside of cylinder 101 between it and the interior of shell 47. This material is worked in evenly all round the cardboard cylinder in the area shown at 78 in Fig. 14 somewhat below the waistline. Then the cardboard cylinder 101 is removed, and the ends of the adhesive-backed strips 86 of tag material, advantageously about 1½" in width, are pressed against and adhesively secured to the inside of the flange of plate 82.

These strips are now molded over the packing in the area 78 and their opposite ends are pressed and adhesively attached around the inside of the shell at the hip level 87. In putting in these strips, they are first placed over the side seams, then over the center seams front and back, and then the area between these strips is filled in with other strips overlapping one another. The length and number of the strips will vary according to the size of the dress form.

Figure 15:
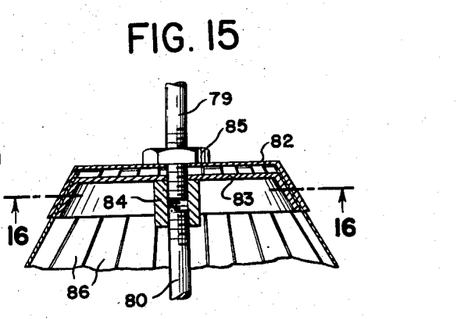
Fig. 15 is a vertical section taken on line 15—15 of Fig. 14.
Figure 16:
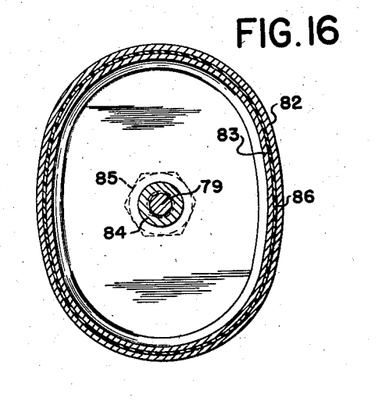
Fig. 16 is a horizontal section taken on line 16—16 of Fig. 15.

When this has been done, coupling 84 is removed from the end of tube 79, and liquid adhesive is applied to the outside surfaces of the ends of the strips 86 and to the convex surface of the flange of the second plate 83. Plate 83 is then pressed firmly in place and coupling 84 is again threaded onto tube 79 and screwed down, so as to firmly clamp the parts in position, as shown in Fig. 15.

The lower part of the reinforcing lining of the shell 47 is now added, consisting of the vertical 1½" strips of adhesive-backed tag material. The strips are applied to the seams first, and then the intervening spaces filled in, so that the strips overlap one another. Next, the diagonal strips 89 are placed in position to complete the lower lining.

Following this, the lower and longer tube section 80 is screwed into coupling 84, and nut 95 adjusted to be at a level just above the lower edge of the dress form.

The dress form is removed from the frame 98. The slotted brackets 93 are placed over the tube 80 and their forked ends adjusted to engage the ring 90. Then collar 96 is applied to clamp these members in position, and the screw 97 tightened after brackets 93 have been adjusted according to the body thickness and posture of the client. Should the body thickness at the waistline be incorrect according to the client's measurements, a long needle is used to pass a heavy linen thread through the form, and the thread is tied, so as to properly control the thickness.

The dress form is then finished off by placing packing material in the neck portion 60 inserting a wood plug (not shown) of the necessary length in the upper end of tube 79, and the wood cap 81 is applied and secured to the plug by means of a screw. The final operation is to place a tape around the waistline and tighten the tape, so as to compress the shell 47 to the correct waistline size.

Should it be desired to make the improved dress form in standard sizes instead of individualized, it will be understood that the tracings on the dimensionally stable inextensible, adhesive-backed sheets may be made from standard patterns, or from sections of impressions made on standard size dress forms instead of on the person or torso of a client.

An important advantage of a dress form according to this invention, which should not be overlooked, is that it is substantially as flexible and resilient as the human body and thus permits one to put on it and remove from it a complete garment without ripping any of the seams. The resilient shoulder form and busts contribute greatly to this end.

It will be understood that, wherever, the term "rubber" is used throughout this specification, it is intended to include synthetic as well as natural rubber, and any material having similar properties.

I claim:

1. The method of making an individualized dress form which comprises applying to the person of an individual a thing layer of flexible protective material, applying thereover strips of adhesive-backed flexible material to produce, when removed from the person, a self-sustaining impression of the shape and size of the individual, severing said impression centrally and vertically at the back and front and removing the impression in two half portions, cutting said half portions longitudinally into sections, flattening each of said impression sections by slitting and opening angular slots at the rounded portions thereof, tracing the outline of said flattened impression sections on adhesive-backed flexible sheet material, adhesively applying said sheet material to thick cellular rubber sheet material having a fabric facing, the adhesive contacting said facing, simultaneously cutting said adhesive-backed material and said cellular rubber material along said traced outlines, removing said adhesive-backed material, closing said angular slots and stitching together the abutting edges thereof so as to reproduce the contour and curved shape of said impression sections, stitching said shaped rubber sections together to form the outer shell structure of the dress form, filling the interior of said shell structure with resilient packing material, and mounting said structure on a support.

2. The method of making an individualized dress form as set forth in claim 1, wherein the thin layer of flexible protective material is applied by winding about the person thin flexible material in strip form, said strip material being uncoated with adhesive on either side.

3. The method of making an impression for use in making an individual dress form which comprises winding about the torso of an individual thin, flexible material in strip form and at least the body-engaging side of which is free of any adherent substance, overlapping the convolutions thereof, to form a flexible, protective layer, and applying over said layer adhesive-backed flexible and substantially inextensible material, said adhesive-backed material being applied in part as a continuous narrow strip wound about the torso and in part as short, narrow strips overlaid in different angular directions to build up sufficient thickness so as to produce, when removed from the torso, a flexible self-sustaining form.

4. The steps in the method of making a dress form which comprise assembling a shoulder shape and bust shapes of cellular rubber within a cellular rubber shell structure, supporting said shell structure in inverted position, placing packing material within the shell substantially to the waist line thereof, inserting a rod-like support in a central aperture in the shoulder shape, said support including a plate-like structure approximately at the diaphragm location, inserting a hollow cylinder to rest upon said plate structure, said cylinder having approximately the same diameter as said plate-like structure, inserting filling material around the outside of said cylinder to fill the area of the dress form between the waist and the upper portion of the hips, removing said hollow cylinder, attaching the end portions of a series of strips of sheet material around the periphery of said plate structure, and securing the lower ends thereof to the interior surface of said shell at substantially the widest portion of the hips.

5. In a dress form, a shell structure extending from the neck portion to below the hips, a molded cellular rubber shoulder shape secured within the uper portion of said shell structure, resilient packing material within said shell structure below the shoulder shape, a rod-like support for the dress form extending vertically thereof, the upper portion of said rod-like support being received within an aperture in the shoulder shape, a plate structure mounted on said rod-like support approximately at the diaphragm location, a series of strips of sheet material extending downwardly from said support, the upper ends of said strips being secured to said plate structure and the lower ends thereof being secured to the inside surface of said shell structure, said strips serving with said plate structure to support said packing material, means for reenforcing the interior of said shell structure from below the ends of said strips to the bottom of the shell, and means for attaching the lower edge of said shell structure to said rod-like support.

6. A dress form as set forth in claim 5, wherein the plate structure comprises two plate-like members having nesting conical flange portions, the upper ends of the strips of sheet material being disposed between said flanges, and wherein means is provided on the supporting structure for forcing said plates into clamping relation with said strips.

7. A dress form as set forth in claim 5, wherein a resilient reenforcing ring is secured around the lower edge of the shell structure, and wherein the attaching means to the tubular support comprises a pair of brackets engaging diametrically opposite points of said ring, said brackets being mounted on said tubular support for lateral adjustment with respect thereto.

8. A dress form as set forth in claim 5, wherein the tubular support extends through a shoulder shape into the neck portion of the shell structure, and a cap member is applied to the top of said neck portion to close the same, said cap member being secured to the upper end of said tubular support.

9. The steps in the method of making a dress form which comprise assembling a shoulder shape and bust shapes of cellular rubber within a flexible shell structure, supporting said shell structure in inverted position, while placing packing material within the shell substantially to the waist line thereof, inserting a centrally and longitudinally thereof a rod-like support including a plate-like structure and disposing said structure approximately at the diaphragm location, attaching the end portions of a series of strips of sheet material around the periphery of said plate structure, inserting filling material to fill the area of the dress form between the waist and the upper portion of the hips and outside of said strips, and securing the lower ends of said strips to the interior surface of said shell at substantially the widest portion of the hips.

10. The steps in the method of making a dress form which comprise assembling a shoulder shape and bust shapes of cellular rubber within a flexible shell structure, supporting said shell structure in inverted position while placing packing material within the shell substantially to the waist line thereof, inserting centrally and longitudinally thereof, a rod-like support, and reinforcing the interior of said shell structure at the lower portion thereof.

11. In a dress form, a flexible self-sustaining shell structure extending from the neck portion to below the hips, a molded cellular rubber shoulder shape secured within the upper portion of said shell structure and extending from shoulder to shoulder and from front to rear of said shell structure, resilient packing material within said shell structure below the shoulder shape, a rod-like support for the dress form extending vertically thereof, the upper portion of said rod-like support being received within an aperture in the shoulder shape, a plate structure mounted on said rod-like support approximately at the diaphragm location, means for reinforcing the interior of said shell structure at the lower portion thereof, and means for attaching the lower edge of said shell structure to said rod-like support.

12. A dress form construction as claimed in claim 11 wherein molded cellular rubber bust forms are secured within the upper portion of the shell structure between the interior surface of said shell structure and said resilient packing material.

13. The steps in a method of making an individual dress form which comprise covering completely the torso of an individual with thin flexible material, both sides of which are free of any adherent substance, to form a flexible, protective layer, applying over said layer adhesive-backed flexible and substantially inextensible material, said adhesive-backed material being applied in part as a continuous narrow strip wound about the torso and in part as short, narrow strips overlaid in different angular directions to build up sufficient thickness so as to produce, when removed from the torso, a flexible, substantially self-sustaining form, removing said form from the individual, utilizing said form to form a shell, assembling a preformed shoulder shape of cellular rubber-like material within said shell, supporting said shell in inverted position placing packing material within the shell substantially to the waist line thereof, inserting a rod-like support in a central aperture in the shoulder shape, said support including a plate-like structure approximately at the diaphragm location, attaching the end portions of a series of strips of sheet material around the periphery of said plate structure, inserting filling material to fill the area of the dress form between the waist and the upper portion of the hips and outside of said strips, and securing the lower ends of said strips to the interior surface of said shell at substantially the widest portion of the hips.

14. The method of making an individual dress form according to claim 13 which includes the step of assembling preformed bust shapes of cellular rubber-like material within the shell along with said shoulder shape.

References Cited in the file of this patent
UNITED STATES PATENTS

| | | |
|---|---|---|
| 1,102,711 | Bailey | July 7, 1914 |
| 1,248,028 | Smith | Nov. 27, 1917 |
| 1,447,372 | Bailey | Mar. 6, 1923 |
| 1,469,653 | Jankus | Oct. 2, 1923 |
| 2,376,553 | Pattern | May 22, 1945 |
| 2,533,906 | Akers | Dec. 12, 1950 |
| 2,610,773 | Nyberg | Sept. 16, 1952 |